Oct. 23, 1962    J. J. SANDERS    3,060,114
APPARATUS FOR CUTTING AND MACHINING METALS ELECTROCHEMICALLY
Filed Feb. 6, 1958    5 Sheets-Sheet 1
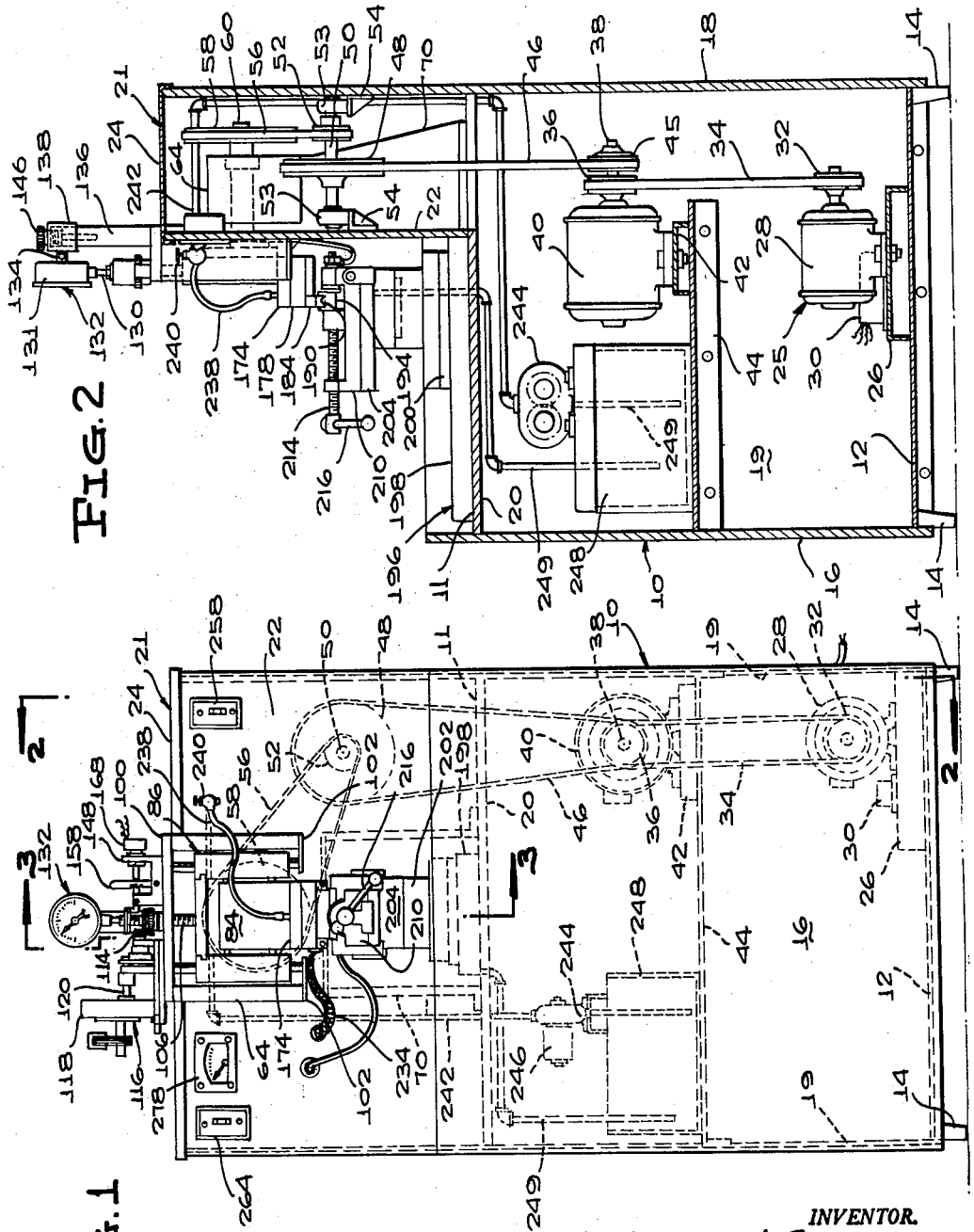
INVENTOR.
JOSEPH J. SANDERS
BY
Trachtman & Zoda
ATTORNEYS

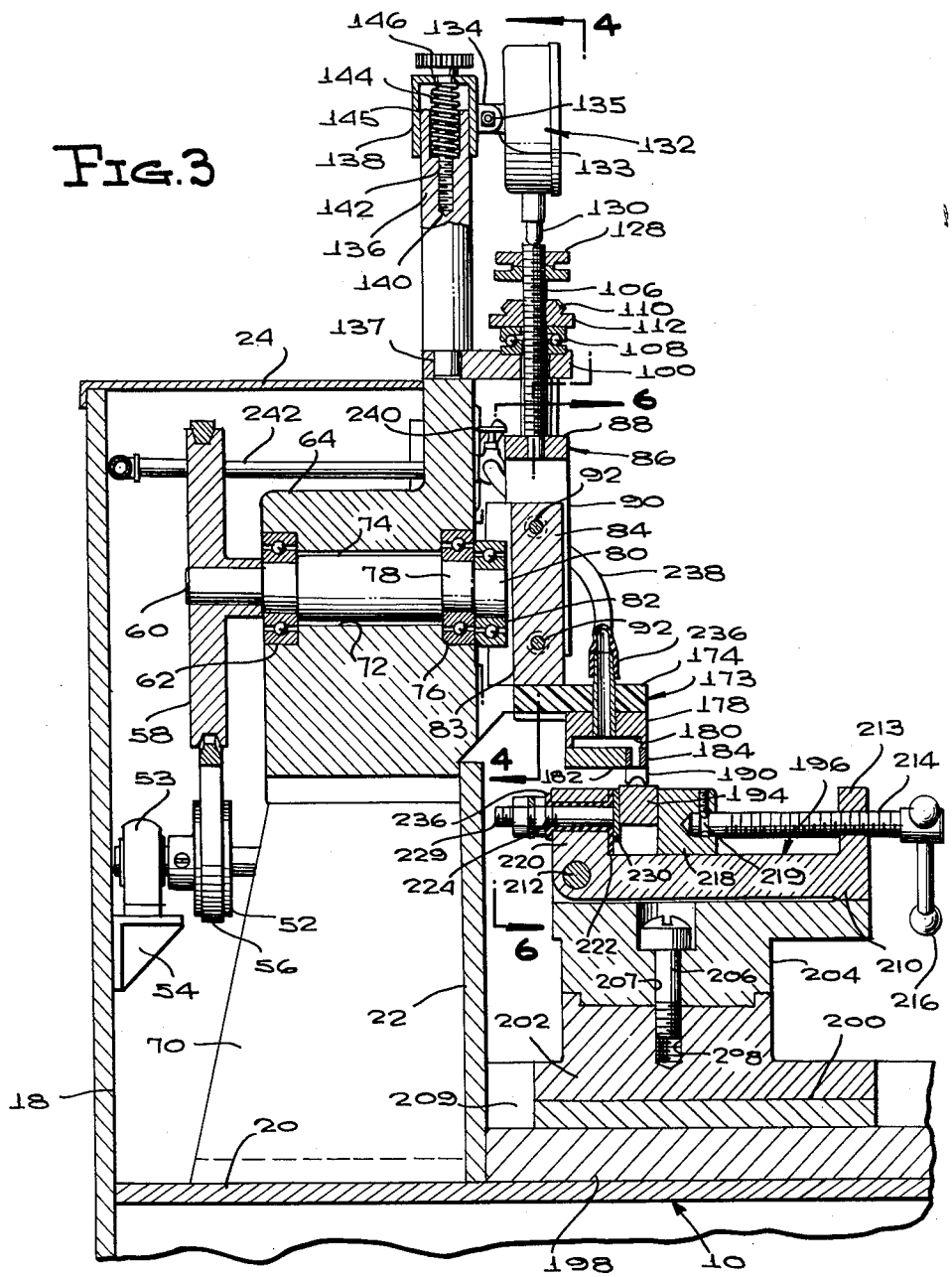

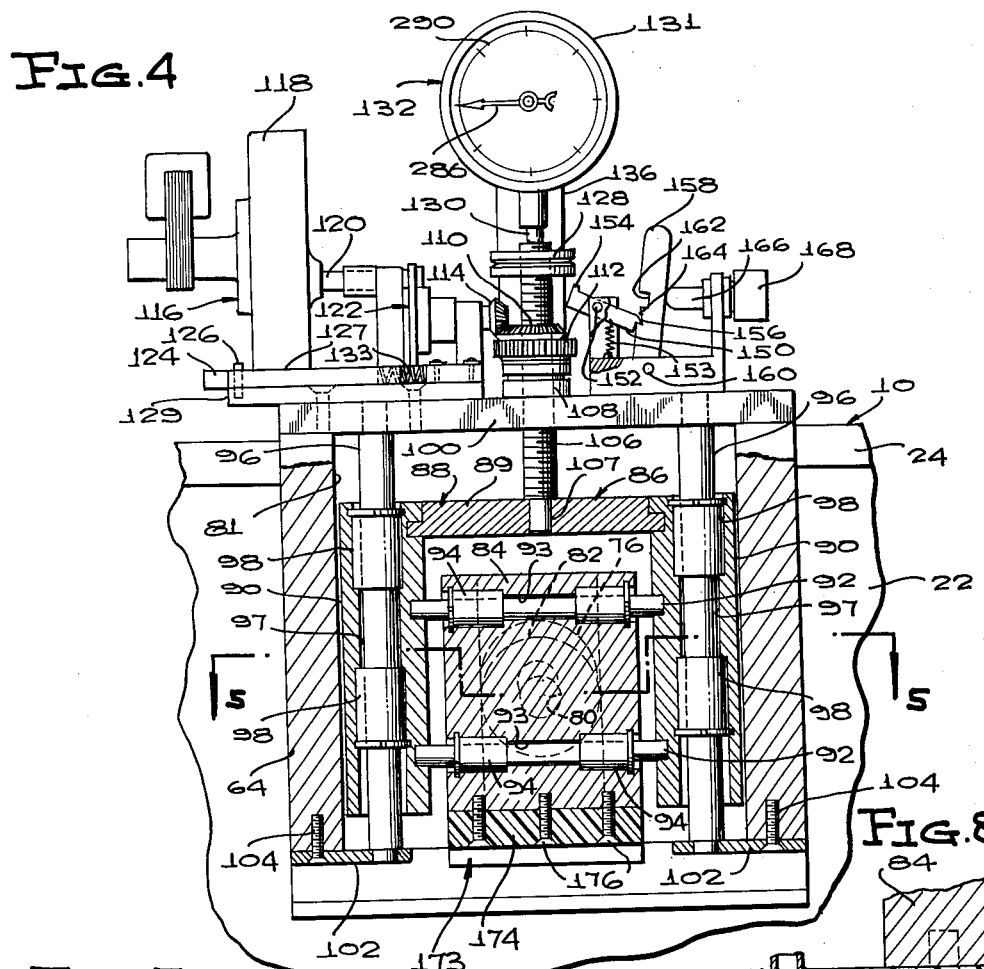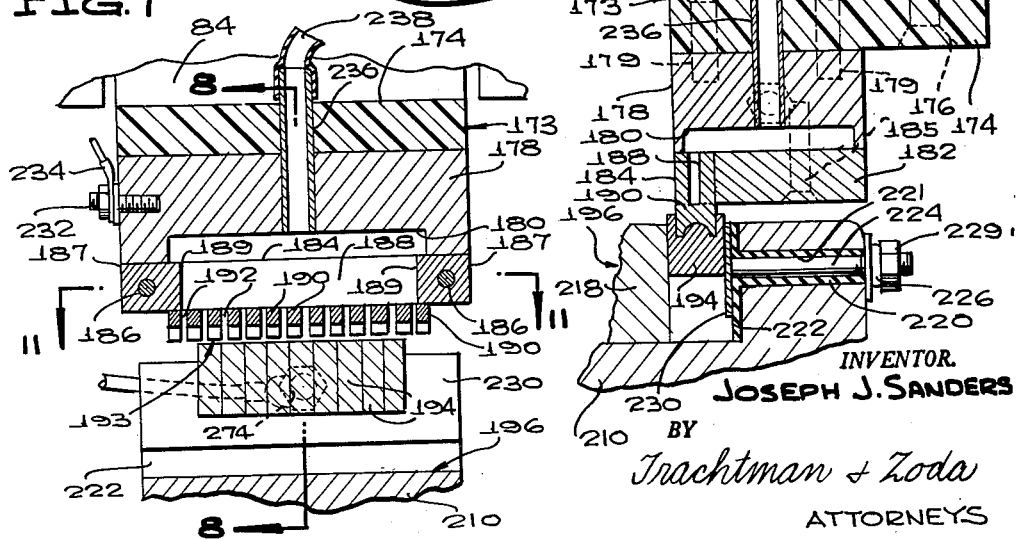

Oct. 23, 1962 J. J. SANDERS 3,060,114
APPARATUS FOR CUTTING AND MACHINING METALS ELECTROCHEMICALLY
Filed Feb. 6, 1958 5 Sheets-Sheet 4
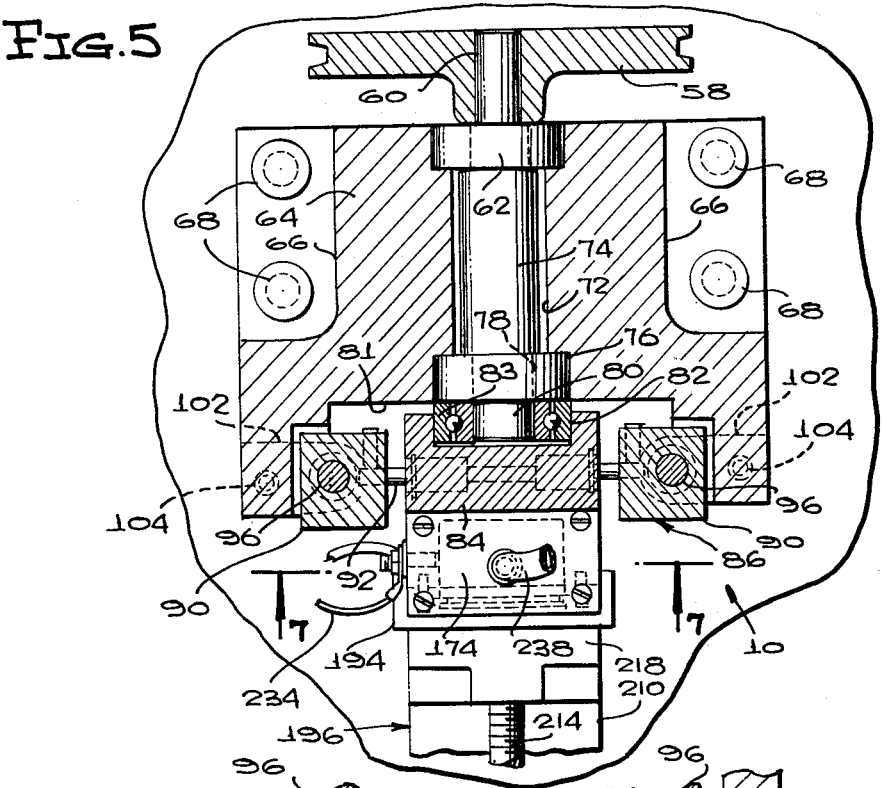
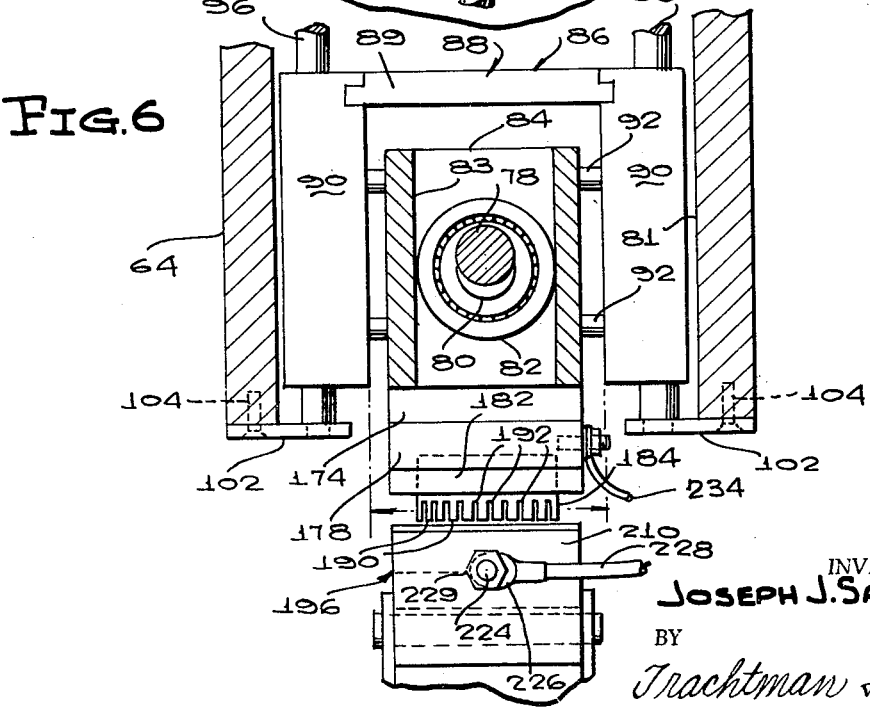
INVENTOR.
JOSEPH J. SANDERS
BY
Trachtman & Zoda
ATTORNEYS Oct. 23, 1962   J. J. SANDERS   3,060,114
APPARATUS FOR CUTTING AND MACHINING METALS ELECTROCHEMICALLY
Filed Feb. 6, 1958   5 Sheets-Sheet 5
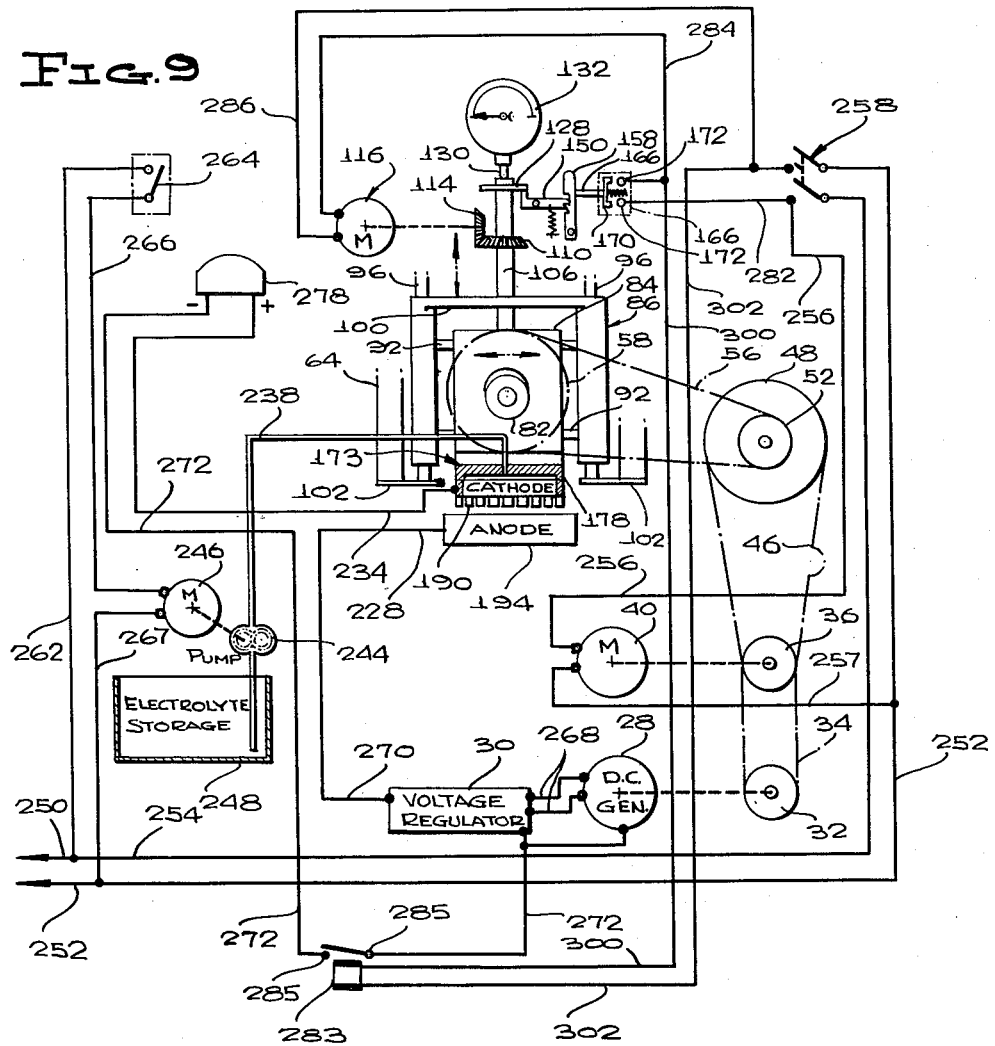
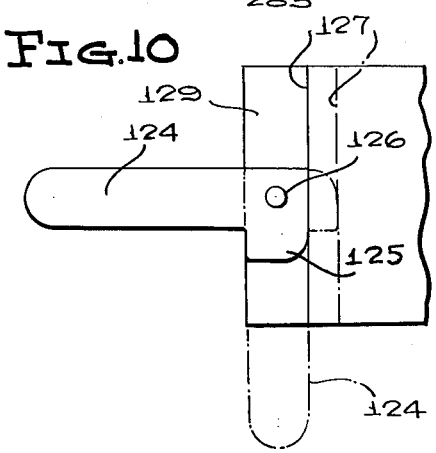
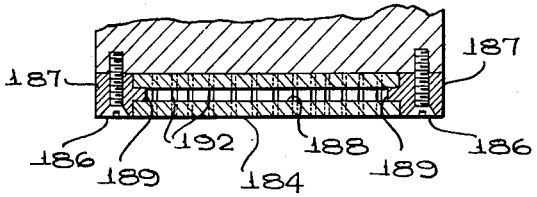
INVENTOR.
JOSEPH J. SANDERS
BY
Trachtman & Zoda
ATTORNEYS United States Patent Office 3,060,114
Patented Oct. 23, 1962

3,060,114
APPARATUS FOR CUTTING AND MACHINING METALS ELECTROCHEMICALLY
Joseph J. Sanders, Philadelphia, Pa., assignor of forty percent to William J. Barry, and ten percent to Albert J. Palombo, both of Philadelphia, Pa.
Filed Feb. 6, 1958, Ser. No. 713,711
2 Claims. (Cl. 204—225)

This invention relates to a novel method of and means for machining metallic materials by electrochemical action.

The machining, grinding, or related formation of work pieces by electrochemical action has, over the years, found steadily increasing favor among those concerned with the production of machined metal shapes. This method has been variously called electrochemical machining or electrolytic grinding. Herein, these terms will be used interchangeably; however, the use of either term to the exclusion of the other, or the use of these terms to the exclusion of such others as may be found from time to time in literature bearing upon this particular type of process, is not to be held unduly restrictive of the invention, since the invention is intended to have the broadest application possible in the light of the appended claims and of appropriate statutory provisions and judicial precedents.

In any event, in electrolytic grinding, the phenomenon which is the heart of the method is the anodic chemical dissolution of the work piece. The work piece is the anode and is made positive; the machining tool (known as the cathodic former) is the cathode and is made negative. A small gap or space is provided between the tool and the work piece, and is on the order of a few thousandths of an inch at most. A flow of an electrolyte, such as a solution of a highly conductive sodium salt, is then introduced into the space between the anodic work piece and the cathodic forming tool.

The solution thus carries an electrical current from the positive work to the negative tool and metal or metal carbides, due to the electric current, then undergo a chemical dissolution in the work surface. The dissolution products, in the form of metal salts or metal oxides, or both, are washed away by the stream of the applied electrolyte.

The intentional electrolytic removal of metals is, of course, very old. For example, there is a well known method known as electro-pickling, and also the method known as electro-polishing. In each of these the work is positive, and the metal is removed from the work by electrochemical action. Electrolytic grinding differs, however, from previously known methods of electrochemical stock removal, such as those described, in that substantially higher current densities are used, with a view to selective control of the area and the amount of stock removed. By the use of high current densities, and by the further use of a close gap between the anode and cathode, with a selected part of the area of the anodic work piece being presented to the cathodic former, one is able to swiftly and accurately remove stock from a particular area of the work piece, while other areas of the work piece are left unaffected.

The above constitutes a brief statement of the general principles which obtain in electrolytic grinding and in closely related processes. It is appropriate now to consider the apparatus which has heretofore been conventionally employed for the purpose of making use of these principles. It is further appropriate to consider the characteristics of such apparatus, and why said characteristics make desirable the present invention, which is intended to constitute a distinct improvement over methods and machines heretofore employed in electrolytic machining or grinding operations.

One method and apparatus that has heretofore been widely used is that which makes use of a spark discharge. In the spark discharge method there is the pronounced disadvantage that the use of a spark discharge causes both the work and the cathodic former to erode, and thus requires frequent dressing or replacement of the cathodic former. Further, this method requires higher voltage than is desirable; the present invention thus aims to permit the machining operation to be carried out by a markedly lower voltage than is required in the spark discharge method.

A second method makes use of a revolving metallic disc. This is connected to the cathode of the D.C. circuit through the use of a revolving contact or equivalent means. The disc is then made to revolve against the anodic work piece, with either the face of the disc or the periphery thereof being presented to the work piece, according to the particular work situation and the nature of the electrolytic action that is to be carried out in forming the work piece.

This is a very common method of electroylitic grinding, but it has pronounced disadvantages. For example, the use of a rotating wheel or disc cathode in periphery presentation to the work is prone to produce sparking or arcing, in that the approach of the cathode to the general plane of the surface of the work is such that there is a continuously decreasing distance between a particular point on the disc and the plane of the work surface. The plane of the work surface is tangential to the disc, or substantially so. The approach, thus, tends toward a line of tangency to the disc, and this has been found to produce sparking.

In the method employing a rotating wheel or disc, it is possible to produce specially grooved, fluted, rounded, asymmetrical or other somewhat unusual surface configurations of the work piece, if the mating form is in the periphery of the disc. However, the rate of electrochemical dissolution of the work would be very slow, and if the mating form of the disc were faced with diamond bort, the cost of the disc would be very high.

It is also the practice, in the rotary disc method, to use pressure to move the disc toward the work or vice versa. This is undesirable, since it tends toward abrasion of the work piece, and in addition tends toward rapid wearing of the wheel, which, it may be noted, is of expensive construction. Such a wheel is faced with diamond bort, and the impregnation of the discs with particles or bort of this kind raises considerably the costs of the discs.

Notwithstanding this relatively high cost of grinding wheels, the metallic area of the cathodic disc that can conduct electricity is reduced in direct proportion to the concentration of the diamond bort, thus further reducing electrochemical action. This particular reduction of electrochemical action is accompanied by a simultaneous further loss of such action, that results from the fact that the electrolyte forced against the face or periphery of the disc, is quickly removed therefrom by the centrifugal action of the revolving disc, so that very small amounts of electrolyte remain upon the disc. The amount of electrolyte that so remains is thus inadequate to maintain full electrochemical action over the area covered by the disc.

The present invention involves a completely new approach to the entire problem of increasing the overall efficiency, versatility, and speed of electrochemical machining. To my knowledge there has never previously been employed, in the art of removal of metals by electrolytic action, the concept of a cathodic former having a straight-line, reciprocating motion in respect to the anodic work piece, accompanied by a progressive advancement of the cathodic former bodily toward the work piece as a corresponding progressive dissolution of the work piece occurs, said advancement being in a path that is in intersecting relation to the path of rectilinear motion of the former.

In carrying out the invention it is proposed, through the use of a former having a motion as described above, together with the employment of certain additional novel features to be made apparent hereinafter, to eliminate many deficiencies which have been heretofore thought to constitute necessary evils, so to speak, in the accomplishment of machining by electrochemical apparatus.

For example, it is proposed in carrying out the invention to accomplish, among others, the following important objects:

To permit an almost limitless variation of cathodic shapes so as to provide for electrochemical machining of anodic work pieces into a correspondingly almost limitless variation of complementary shapes;

To permit the former to be made of a very low cost material, as compared to the cost involved in the use of diamond-impregnated grinding discs, the invention being such that the cathodic former can be made of any low cost material that will conduct electricity;

To characterize the action, even though using in the former a relatively inexpensive material, by a pronounced absence of abrasive action against the work piece by the former, as distinguished from diamond-impregnated discs, which have had the characteristic of scratching or abrading the work piece to an undesirably great extent;

Through the use of a cathodic former having a straight-line reciprocating motion, to permit a greater area of the work to be machined than has heretofore been possible with diamond wheels, thus to reduce the time required to machine large areas;

To increase to a marked degree the number of pieces, as well as the amount of the area that can be machined at a single time, with said number being limited only by the size of the cathodic formers and the power available;

To provide an improved electrolytic action, by the use of a former having apertures communicating with the inter-electrode gap at predetermined locations, through which apertures the electrolyte will be pumped at a selected rate so as to be uniformly introduced over the entire area of the inter-electrode space, throughout the operation of machining the work;

To permit the machining of the work piece in a way such as to reduce the length of travel of the cathodic former to a highly desirable minimum that will be only a small fraction of the distance which must be traveled by the cathodic element, or alternatively by the work itself, when conventional electrolytic grinding processes are employed;

To permit the simultaneous machining, while still keeping the length of the stroke or travel of the cathodic former to a minimum, of a large number of work pieces, whereby to permit, in a given time, the machining of a multiplicity of the work pieces where one only has heretofore been capable of being machined in the same amount of time;

To provide for plane-to-plane presentation of the cathode to the anode, and vice versa, with the cathode having its reciprocating motion in a plane paralleling the face of the work piece being machined, so as to first eliminate sparking, and second, (by coactively relating the plane-to-plane presentation of movement of the cathode and anode to a positive, accurately controlled introduction of electrolyte to the inter-electrode gap from within the cathode) to produce a highly improved process of electrolysis that has not heretofore been found in electrolytic techniques;

To eliminate all pressure or contact between the cathodic former and the work, so that the cathodic former will last indefinitely;

To eliminate hand feeding such as has heretofore been required in the conventional electrolytic grinding methods referred to above; and To provide a particular arrangement such that no oxide film, of the type that would cause the anode to become passive or no longer capable of electrolytic action, will persist, thus to eliminate completely the necessity of using abrasives such as have heretofore been involved, it being well known that the diamond particles are required for scraping off insulating oxides or silicate or aluminate films which otherwise tend to form on the work piece and which by their insulating quality inhibit further electrochemical attacks of the work.

Summarized briefly, the apparatus to be described herein, in which the inventive concept is at present physically embodied, has, in common with previous methods employing D.C. current, an arrangement wherein the cathode is the forming unit and the anode is the work piece. As distinguished from the previous methods and machines, however, the machine involves a novel geometric presentation of the forming cathode to the anodic work piece, involving a short rectilinear reciprocating motion of the cathode in a path parallel to the general plane of the work piece face being machined, occurring simultaneously with a bodily movement of the cathode toward the work piece in a path intersecting that in which it reciprocates.

In accordance with the invention, the last mentioned motion occurs under controlled conditions such that progressive dissolution of the face of the work piece occurs until said face has been machined to the desired depth and mates perfectly with the cathode, there being, at all times during the operation, a constant gap of approximately .005 inch between the cathode and anode. The cathode is apertured and electrolyte is pumped through the cathode, passing from the inside of the cathode to the apertures to the mentioned gap, in a manner such that there is at all times an adequate, fresh supply of electrolyte in the inter-electrode gap. This will insure not only an improved electrolysis, but also an efficient washing away of any materials that have been released by the electrolysis, simultaneously with an agitation of the electrolyte within the electrolytic cell, that is, within the mentioned inter-electrode gap.

Further summarized, the invention involves means for swiftly presetting the appropriate components of the apparatus to insure that dissolution of the work will not occur beyond the predetermined depth and outside the predetermined surface areas established for the particular operation. Also incorporated in the invention is a means providing for automatic stoppage of the apparatus as soon as the required, selected depth in the work piece has been reached.

Other objects will appear from the following description, the claims appended thereto, and from the annexed drawings, in which like reference characters designate like parts throughout the several views, and wherein:

FIGURE 1 is a front elevational view of an electrolytic grinding or machining apparatus according to the present invention;

FIGURE 2 is a vertical sectional view therethrough taken substantially on line 2—2 of FIGURE 1;

FIGURE 3 is an enlarged sectional view through the apparatus, taken substantially on line 3—3 of FIGURE 1;

FIGURE 4 is a sectional view on the same scale as and at right angles to the cutting plane of FIGURE 3, taken substantially on line 4—4 of FIGURE 3;

FIGURE 5 is a horizontal sectional view, on the same scale as FIGURE 4, taken substantially on line 5—5 of FIGURE 4, illustrating the supporting assembly or head that carries the cathodic former;

FIGURE 6 is a sectional view, on the same scale as

FIGURE 5, of the assembly shown in FIGURE 5, taken substantially on line 6—6 of FIGURE 3;

FIGURE 7 is a detail sectional view, enlarged above the scale of FIGURE 5, through the cathodic former and work piece, substantially on line 7—7 of FIGURE 5;

FIGURE 8 is a sectional view on the same scale as FIGURE 7, taken substantially on line 8—8 of FIGURE 7, the cathode being shown at the completion of the work machining operation, as distinguished from FIGURE 7 in which the cathode is shown at the start of said operation;

FIGURE 9 is a schematic representation of the electrical circuits embodied in the invention; and FIGURE 10 is a fragmentary top plan view of a means for biasing a support plate and the components supported thereby to an operative position.

Referring to the drawing in detail, the apparatus of the invention includes, in the presently preferred, illustrated embodiment, a large, upstanding housing generally designated 10 having a lower portion extending the full depth and width of the apparatus, said lower portion at its top providing a recessed table surface 11 (FIGURES 1 and 2) at the back of which is an upstanding portion of the housing which is of reduced depth, though being of the full width of the apparatus. Of course, the shape of the housing might vary, in a commercial embodiment, as long as the inventive concept inherent in the invention is retained.

The housing 10 is provided, at its lower end, with a horizontal, rectangular bottom plate 12 to the corners of which are secured short, depending legs 14. The housing further includes a vertical front wall 16, a vertical back wall 18, and vertical side walls 19. All these are fixedly secured to and extend upwardly from the periphery of the bottom plate 12, and cooperate therewith in defining a compartment for the motors and other components used in the invention. The housing further includes a horizontal top wall 20 which provides the table surface 11 and which extends rearwardly from the front to the back wall.

The top portion of the housing, that is, the portion of reduced depth that extends upwardly at the back of the table surface 11, has been generally designated 21 and is in full communication with the lower portion of the housing, due to the provision of openings provided in top wall 20.

The back wall of the top portion 21 is formed by the back wall 18, which is extended upwardly above the plane of the table surface 11 for this purpose. The front wall 22 of the top portion 21 is extended upwardly from the table surface, and closing the top portion at the sides thereof are the side walls 19, which are of reduced width over the area of the top portion 21 of the housing. At its upper extremity, the top portion 21 of the housing is closed by a cover plate 24 which may be flanged and which is removable for the purpose of providing access to the interior of the housing. Of course, access plates and other means facilitating maintenance or repair of interior components of the device can be located wherever desired.

A drive means utilized for imparting to the cathodic former the reciprocating motion hereinbefore referred to has been generally designated at 25, and includes a motor, generator, voltage regulator, belt-and-pulley linkages, and other driving components to be described in full detail hereinafter. Referring to FIGURES 1 and 2, fixedly mounted upon the wall 12 of the housing is a support bracket 26, on which is fixedly mounted a D.C. generator 28, at the side of which is mounted a voltage regulator 30 which, as will be described in full detail hereinafter, is in circuit with the generator.

Rotating the shaft of the generator is a pulley 32 about which is trained a belt 34, trained also about a drive pulley 36 secured to the shaft 38 of an electric motor 40 fixedly mounted upon a motor support bracket 42, that is rigidly connected to and is supported upon a horizontal support plate 44 extending between and affixed to the side walls 19.

Rotatable with the motor shaft 38 is a drive pulley 45 about which is trained a belt 46 extending upwardly into the top portion 21 of the housing, in which it is trained about a large-diameter driven pulley 48. Pulley 48 is secured to and rotates with a jack-shaft 50. This extends in a fore-and-aft direction within the top portion 21 of the housing and is journalled at its ends in bearings 53 mounted upon bearing brackets 54 carried by walls 18, 22 (see FIGURE 2).

Secured to the shaft 50 for rotation therewith is a small transmission pulley 52, about which is trained a belt 56 trained about and driving a large driven pulley 58. Pulley 58 is secured to the reduced rear end (see FIGURES 2, 3 and 5) of a drive shaft 60 the rear end portion of which is mounted in a ball bearing 62 supported in a bearing recess provided in the back wall of a large, centrally disposed block 64. Block 64 at its opposite sides (FIGURE 5) has recesses 66, defining on the block attaching flanges apertured to receive mounting bolts 68. These are extended into a large block support bracket 70 fixedly mounted on, and extending upwardly from, top wall 20 and formed to an inverted U-shape, as best shown in FIGURE 1.

Formed in the block 64 is a large-diameter bore 72 extending in a fore-and-aft direction, from front to back of the block. Extending within bore 72 is the enlarged main portion 74 of shaft 60. A ball bearing 76 is mounted in a counterbore provided at the forward end of bore 72, with the shaft having a reduced part 78 journalled in said bearing.

Integrally formed upon the forward end of the shaft 60 is an eccentric extension 80, journalled in a ball bearing 82 mounted within a rearwardly opening recess 83 formed in the back surface of a cathode support block 84 which forms a component of a cathode support carriage generally designated 86.

The carriage 86 includes a frame 88 of inverted U-shape having a bight portion 89 fixedly connected at its opposite extremities by a suitable joint to the upper ends of the legs or side portions 90 of the frame 88.

Referring particularly to FIGURE 4, the block 84 is mounted for horizontal receprocating motion within the U-shaped frame 88, said frame being in embracing relation to said block 84. To this end, there are provided vertically spaced, horizontally disposed support rails 92, the opposite ends of which are engaged in suitable recesses provided in the confronting inner surfaces of the side portions 90 of the frame 88.

The block 84 has horizontal, transverse bores 93 in which the rails 92 are slidably engaged, and mounted in enlarged end portions of bores 93 are bushings 94 slidable on the rails. By reason of this arrangement, block 84 is adapted to slide horizontally, viewing the same as in FIGURE 4, in opposite directions upon the rails 92, in respect to the frame 88. The frame 88 is itself mounted for vertical reciprocating motion, on vertical rails 96, extending through bores 97 provided in the side portions 90. Bushings 98 are mounted in enlarged parts of the bores 97, with said bushings sliding upon the rails 96.

At their upper ends, rails 96 are engaged in openings formed in a forwardly projecting, horizontally disposed ledge 100 (FIGURES 3 and 4) fixedly mounted upon the upper end of the block 64 so as to provide a top wall for the forwardly opening recess 81 of the block 64. At their lower ends, rails 96 are engaged in openings provided in lower support plates 102, that are secured by screws 104 to the lower ends of the side walls of recess 81 of block 64.

By reason of the construction so far illustrated and described, it will be seen that the rotation of shaft 60 will cause travel of the eccentric in a circular path about the axis of the shaft 60. Since the eccentric is engaged at opposite sides by the side walls of the recess 83 (see FIGURE 6), said travel of the eccentric will cause horizontal reciprocation of the block 84 which, as will be presently made fully apparent, carries the cathodic former.

Extending in parallel relation to and disposed midway between the rails 96 (see FIGURE 4) is a feed screw 106, having a reduced lower end 107 swivelly engaged in a center opening of the frame 88.

Referring to FIGURE 3, designated at 108 is a thrust bearing above which a beveled gear 110 is threadedly engaged with the feed screw. Gear 110 is integral or otherwise made rigid with a knurled feed nut or handwheel 112.

Referring now to FIGURE 4, in mesh with the gear 110 is a beveled drive pinion 114. Generally designated at 116 is a synchronous electric motor, mounted in a bracket 118, and having a built-in speed reducer. The motor has a shaft 120 having a driving connection to the pinion 114.

A cam lever 124, having a head 125 (see FIGURE 10), is pivoted upon a stud 126. The cam lever serves to impart horizontal slidable movement to a support plate 127 carrying the motor 116, the speed reducer, etc. Plate 127 slides on a base plate 129 from which the stud projects. Suitable hold-down means is provided for the plate 127, to keep it from rising from its guideway during its slidable movement. In this way, the motor 116, speed reducer, and gear 114 can be bodily shifted as a unit horizontally to the right in FIGURE 10 from its full line to its dotted line position, to engage the gear 114 with the gear 110. When the lever is subsequently swung from its dotted to its full line position, the return movement of the plate 127 is caused by compression coil springs 123, interposed between the base plate 129 and the support plate 127.

Feed stop nuts 128 are threadedly engaged with the upper end portion of the feed screw 106, it being understood that the lower nut 128 can be adjusted to a selected position longitudinally of the feed screw, after which the upper nut can be threaded thereagainst, serving as a jam nut to lock the lower nut in the selected position to which it was adjusted.

Bearing against the upper end of the feed screw, and aligned coaxially with the feed screw, is a plunger 130 spring biased in a downward direction, out of the housing 131 of a depth gauge 132. The housing 131 is formed on its back wall with a rearwardly projecting ear 133 (see FIGURE 3), said ear being pivotally connected to an ear 134 by means of a bolt 135. Ear 134 is projected forwardly from a cap 138 of inverted cup shape, slidably fitted over the upper end portion of a vertically disposed standard 136, having a reduced lower end portion 137 engaged in an opening of ledge 100.

Formed in standard 136 is an axial, threaded recess 140 opening upon the upper end of the standard and threadedly engaged in said recess is a stud 142 about which is circumposed a compression, coil spring 144 seating in a counterbore 145 of recess 140. Fixedly secured to the upper end of the stud 142 is a hand knob 146, disposed above the cap 138, said cap having a center opening in its top wall for swivelly mounting the stud 142 within the cap.

The standard and cap would be so formed as to be held against relative rotation, so that the depth gauge 132 will be maintained in a proper, forwardly facing position.

Bolt 135 is provided with a nut, so that when the depth gauge 132 has been swung to a position in which it is disposed with its plunger 130 coaxially aligned with the feed screw, the nut on the bolt 135 can be tightened, so as to lock the ears 133, 134 against relative movement, thereby fixedly connecting the depth gauge to the cap 138.

The spring 144 serves to continuously bias cap 138 axially upwardly into engagement with knob 146 when screw 142 is threaded in a direction outwardly of recess 140.

By reason of the arrangement illustrated and described, rotation of knob 146 will permit a bodily vertical adjustment of the depth gauge 132, either upwardly or downwardly, whichever is desired.

Reference should now be had to FIGURE 4. Mounted upon the ledge 100, at the side of the feed screw opposite that at which the gear 114 is disposed, is a U-shaped limit switch assembly support bracket 148. Bracket 148 supports for rocking movement a feed trip pawl 150, fulcrumed intermediate its ends at 152 upon one leg of the bracket and normally biased clockwise in FIGURE 4 by a contractile spring 153. Pawl 150, at one end, has an upwardly projecting lug or extension 154 underlying feed stop nuts 128. A small, approximately triangular nose 156 is provided upon the other end of the pawl, and said other end of the pawl is in contact with an upwardly projecting feed start lever 158 pivoted at its lower end upon a pin 160 carried by the bight portion of the bracket 148.

A deep, rectangular upper notch 162 is formed in that edge of the lever 158 that is in confronting relation to pawl 150. Immediately below notch 162 there is a recess 164 of acute-angular shape, in which nose 156 is engageable in one position of the pawl and lever. On rocking of the pawl 150 counterclockwise in FIGURE 4 from its FIGURE 4 position, the nose 156 will slide upwardly along the inclined wall of notch or recess 164, and eventually will clear notch 164, to move into notch 162. This permits lever 158 to swing counterclockwise about its axis 160 from its FIGURE 4 position.

The back edge of the lever 158, that is, the edge opposite that in which notches 162, 164 are formed, is engageable by a spring-loaded plunger 166, projecting out of a housing of a switch 168 that is mounted upon the bracket 148. The plunger 166 is normally biased toward the lever 158 by its associated spring. Referring now to FIGURE 9, within housing 168 a bridging element 170 of electrically conductive material is secured to the plunger 166, and on retraction of the plunger 166 into the housing, said bridging element engages at its opposite ends contacts 172, 172 of the switch assembly.

A full discussion of the characteristics of the various components which have heretofore been described will be included hereinafter in the discussion of the operation. However, at this point it is sufficient to note that the switch assembly including pawl 150, lever 158 and switch 168 is adapted to halt operation of the machine when the work piece has been machined to the full depth desired. Further, the gauge 132 assists in determining what said depth should be, and the feed screw is adjustably pre-set, utilizing the gauge, to the desired depth, all in a manner to be brought out in full detail hereinafter.

It is appropriate now to discuss the cathodic former. This has been shown to its best advantage in FIGURES 7 and 8, although shown to advantage also in the various other figures of the drawing.

The cathodic former, generally designated 173, includes a spacer plate 174 of electrical insulation, connected (see FIGURE 8) to the underside of cathode support block 84 by screws 176. An electrically conductive forming element support block 178 is secured to the underside of plate 174 through the provision of a plurality of connecting screws 179. In the underside of block 178 there is provided a comparatively shallow cavity 180 of substantial area into which, in a manner to be described in detail hereinafter, a suitable electrolytic solution is pumped, for flow through a plurality of apertures provided in a forming element, thereafter to pass into the interelectrode gap provided between the forming element and the work piece.

A mounting plate 182 for the forming element 184 is also of electrically conductive material, as is the forming element itself. The forming element extends in front of the mounting plate. The mounting plate 182 partially closes the cavity 180 at the bottom thereof, and is detachably, fixedly secured to the forming element support block 178 by screws 185 (FIGURE 8). The forming element closes the remainder of the cavity 180.

In the forming element 184 there is provided an open-ended, elongated, narrow slot 188 (FIGURES 7 and 8), in full communication at its top with cavity 180. The forming element is affixed to the mounting plate by screws 186 (FIGURES 7 and 11) extending through smooth-walled openings of clamps 187 into threaded recesses of plate 182. The clamps have tongues 189 extending into and closing the ends of the slots. The arrangement permits swift interchange of forming elements, and also simplifies manufacture of said elements.

Slot 188 extends longitudinally of the row of work pieces, or of the single work piece, that is being machined, and at its bottom, the slot is closed by the work-engaging bottom portion 190 of the forming element 184. The portion 190 is provided at uniformly, closely spaced intervals over its full length with transversely disposed, slot-like apertures 192, providing communication between slots 188 and the inter-electrode gap 193 (FIGURE 7). It will be understood that in FIGURE 7 the forming element is elevated fully out of operative relationship to the work pieces 194. In the operative relationship of the cathodic forming element and of the work pieces, the gap 193 would be on the order of perhaps .005 inch.

In the illustrated example, there is a row of the work pieces. All the work pieces of said row are identical, and all of them are to be machined identically. The work pieces in the illustrated example are all plate-like elements, in one edge of which there is to be formed a deep, semi-rectangular recess, the bottom wall of which has a semi-circular protruberance, as shown in FIGURE 8. This is merely an example of one type of special shape in which a work piece can be machined, following the principles of the invention. A shape such as shown is one that cannot be machined when a conventional rotating disc is used, whether edge or face presentation of the disc to the work is employed. The invention, however, permits the machining of the special shape illustrated, merely by use of a forming element 184 the lower portion 190 of which has a shape mating with that which is to be imparted to the work piece. It is quite obvious that a large number of different forming elements can be provided, the shapes of which may be varied almost without limit, and one can readily substitute one forming element for another without any difficulty whatsoever.

In view of the above, the invention has a marked versatility, far beyond that which is inherent in electrolytic grinding machines heretofore devised, as regards the number and shapes of the work pieces that can be machined at a single time. In the invention, all fifteen work pieces 194 shown in FIGURE 7 would be machined simultaneously and to an equal extent, as distinguished from the practice that would be followed if the row of work pieces were fed to a grinding disc face or periphery. In the latter instance, the work pieces would be in a row that is approximately tangential to the periphery. A long travel of the row would be required, in view of the fact that every work piece in the row would have to travel past a given point on the disc. Conversely, if the work were to be held stationary with the disc traversing the work, the disc would travel the same long path. All this will be brought out in the detailed discussion of the operation that is to follow, and again, need not be dwelled upon at this point.

Referring now to the means for supporting the work piece, a work support has been generally designated 196, and includes a flat base plate 198 fixedly mounted upon the wall 20. Mounted upon the base plate 198 is a bottom or wear plate 200 secured to the underside of a lower pedestal portion 202, on which an upper pedestal portion 204 is swivelly mounted through the provision of a connecting bolt 206 extending through a smooth-walled bore 207 of portion 204 into a threaded recess 208 of portion 202. The lower pedestal portion is mounted for sliding movement in a fore-and-aft direction, that is, to left or right in FIGURE 3, in ways 209 provided at opposite sides of the base plate 198. This permits bodily adjustment of the supported work pieces to left or right in FIGURE 3, to selected positions in respect to the cathodic former generally designated at 173 in FIGURE 3.

Supported upon the upper pedestal portion 204 is a work support arm 210, pivoted on a horizontal, transverse axis through the provision of a pin 212 carried by the pedestal portion. The arm 210 thus swings upwardly from its FIGURE 3 position, pivoting about the axis of the pin 212, and in selected positions to which the arm is swingable, it can be locked through the provision of a nut provided upon the pin, said nut being so designed as to bind the arm 210 in selected positions to which it is swingably adjusted. This, it is believed, is sufficiently obvious as not to require special illustration herein.

Arm 210, at the end thereof remote from the pin 212, has an upwardly projecting wall 213, formed with a threaded opening in which is engaged a horizontally disposed feed screw 214 extending in a fore-and-aft direction and provided with a handle 216.

The feed screw, at its other end, is swivelly engaged in a clamping block or movable clamp jaw 218, the feed screw having a circumferential groove 219 formed in a portion of the feed screw that is engaged in a recess of the jaw 218. A set screw is provided in the jaw 218, engaging in the groove 219 to hold the feed screw 214 and the clamping jaw assembled with one another.

Referring to FIGURES 3 and 8, an insulating liner or sleeve 220 projects through a bore 221, formed in arm 210 and extending from the back surface of the arm to the recess defined between the upwardly projecting rear portion of the arm and the movable jaw 218, in which recess the work pieces 194 are to be clampably engaged. Within the clamping recess so defined, sleeve 220 is integral with a flat spacer plate 222 of insulation material.

An electrically conductive anodic post 224 extends through sleeve 220, and has a threaded portion projecting beyond the back surface of the arm 210. Receiving said threaded portion is an electrical connector 226 provided upon anodic lead 228 (FIGURES 6 and 7). Nuts 229 are threaded on the post. A washer of insulation material is interposed between the connector 226 and the adjacent, back surface of the arm 210.

The post or electrode 224, at its inner end, is rigid with a contact plate 230 which bears directly against the work pieces 194, for transmission of electrical current from the work pieces to the electrode.

A cathodic binding post or electrode 232 (see FIGURE 7) is threadedly or otherwise fixedly engaged in the forming element support block 178, and electrically connected to the post 232 is a lead 234.

Referring now to the means whereby electrolyte is supplied to the interelectrode gap, reference should be had to FIGURES 7 and 8, wherein is shown a conduit 236 fixedly mounted in aligned, vertical bores of insulator plate 174 and support block 178. One end of conduit 236 communicates with the cavity 180. The other end projects above plate 174 and is connected to a flexible electrolyte supply tube or hose 238 (FIGURES 1 and 2). This is connected at its inlet end to a manually operable shut-off or control valve 240 mounted upon the front of the top portion 21 of the housing. To the input side of the valve 240 is connected, within top portion 21, a string of small diameter piping 242, connected at its inlet to the output of a pump 244. The pump is conventional per se and is powered by a motor 246. The pump and motor are mounted upon a reservoir 248 containing a supply of electrolytic fluid, from which fluid is drawn through a vertical tube 249 extending to the intake side of the pump.

When the pump is in operation, the fluid is pumped at a predetermined rate into the cavity 180, and is forced under correspondingly predetermined pressure through the apertures 192 to the inter-electrode gap, so as to completely fill the space between the cathode and anode, assuring a complete and uniform electrolytic action over the full area of the work piece surface.

The electrolyte returns to tank 248 through a return line 249.

It is appropriate now to consider the wiring of the structure. Although various wiring arrangements are possible, that shown in FIGURE 9 may be considered as typical. Extending from a source of electric power are leads 250, 252. Connected to lead 250 is a lead 254 extending to one terminal of a manually operable, double pole, single-throw head assembly drive motor control switch 258. From an associated terminal of the switch extends a lead 256, connected to one terminal of head assembly drive motor 40. The other terminal of motor 40 is connected by lead 257 to lead 252. Therefore, when switch 258 is closed, motor 40 will be placed in operation, to drive the linkage comprising parts 45 through 58, producing rotation of the eccentric 80, the motion of which is translated into horizontal reciprocation of block 84 on rails 92 (see FIGURE 9).

To provide for independent operation of the pump drive motor 246, there is a lead 262 extending from lead 250 to one terminal of a switch 264 manually operable between closed and open positions. A lead 266 is connected between the upper terminal of switch 264 and one side of motor 246. Connected to the other side of the motor 246 is a lead 267, extending to the lead 252 and back to the source of current.

Considering now the means for placing in operation the motor 116 to produce vertical, downward feeding of the cathodic former, on closing of switch 258 current will flow as follows: lead 250; closed switch 258; lead 282; closed switch 168; lead 284; motor 116; lead 286; switch 258; and return to the source of power through lead 252. This A.C. circuit will remain closed until nuts 128 engage feed trip pawl 150, and rock the same counterclockwise in FIGURE 4. This registers the deep recess or notch 162 of lever 158 with the pawl. Under the spring loading of the plunger 166 of the limit switch 168, lever 158 swings to the left in FIGURE 9. Switch 168 opens, and motor 116 is immediately deenergized to stop downward feeding of the cathodic former at the desired point of furthest work penetration.

A D.C. circuit through the cathode and anode is closed and opened simultaneously with the A.C. circuit of motor 116. The D.C. circuit is provided with power from any suitable D.C. source, but by way of example, I show in FIGURE 9 a D.C. generator having leads 268 connected to the armature and field coils thereof respectively, and lead 280 connected with the frame or ground. From the positive terminal of voltage regulator 30, the flow is through lead 270; lead 228; the anode 194; cathode 173; lead 234; D.C. ammeter 278; and lead 272 back to the voltage regulator and D.C. generator.

Connected in the lead 272 are contacts 285. An A.C. relay 283 is energized and deenergized simultaneously with motor 116, and when energized closes contacts 285 to close the D.C. circuit. Therefore, downward feeding of the cathodic former, and electrochemical dissolution of the work, can begin only at the same time. Furthermore, they end at the same time, being terminated automatically as soon as the work has been penetrated to the desired, predetermined depth.

The circuit through the relay is as follows: lead 250; lead 254; switch 258; lead 282; switch 168; lead 300; relay 283; lead 302; switch 258; and return to the source of power through lead 252.

*Operation*

In a typical work situation, such as that illustrated, it will be assumed that a plurality of small work pieces are to be machined. These are disposed in face-to-face contact, in a row as shown in FIGURE 7, and then clamped in the work support 196. Obviously, the vise defined by arm 210 and jaw 218 can be bodily shifted in a horizontal direction, toward or away from the top portion 21 of the housing viewing the same as in FIGURE 3, to position the workpieces at a predetermined location below the cathodic former 173. Further, the arm 210, as previously brought out, could be tilted about the pin 212.

In any event, with the work securely clamped in position, an electrical connection will automatically be provided between the workpieces and the electrode 224.

Now, assuming that the proper forming element 184 has been mounted on the plate 182, thereby providing an electrical connection between the forming element or tool 184 and the cathodic post 232, the first step is to disengage the gear 114 from the beveled driven gear 110. This is done by operation of the cam lever 124, which bodily shifts the slide plate 127, on which is mounted motor 116, speed reducer 122, and gear 114, to the left in FIGURE 4.

The carriage or head assembly generally designated at 86 is now free to be raised or lowered, by rotation of the feed nut or handwheel 112 in a selected direction. As previously noted, this is knurled to facilitate the free rotation thereof by hand, and thrust bearing 108 aids in this free rotational movement.

The workpieces are placed in proper position (if this has not already been done) at this time. The cathodic former 173 is now lowered until the underside of the lower portion 190 of the forming tool or element 184 rests against the workpieces.

As previously noted, lowering of the cathodic former is brought about by rotating the feed nut 112. Since feed screw 106 is freely, vertically slidable in the smoothwalled, feed-screw-receiving opening of ledge 100 (see FIGURE 3), rotation of the handwheel or feed nut 112 will cause vertical movement of the feed screw without rotational movement thereof. This will cause the carriage 86, and with it the cathode support block 84 and cathodic former 173, to be lowered with the feed screw.

Thus, with the work 194 under cathodic former 173, the first step is to lower the depth gauge by rotating knob 146 until plunger 130 rests on the top of feed screw 106. The next step is to set index arm or indicator 286 of gauge 132 at the zero marking, that is, the start position (see FIGURE 4), located at the zero indicium of the scale provided upon the dial of the gauge. Thereafter, as plunger 130 is extended under the spring loading thereof responsive to downward feeding of screw 106, index arm 286 will move away from zero. Retraction of plunger 130 responsive to upward movement of the feed screw tends to move the index arm back to zero. The arm 286 is free to make as many full revolutions as necessary. For example, while gauges of this type may differ, in a typical arrangement there might be dial graduations 290 calibrated from "0" to "50." If each calibration were one-thousandth of an inch, one complete revolution of arm 286 would represent a movement of .050 inch.

Workpieces 194 are now moved clear of the cathodic former. By means of feed nut 112, head assembly or carriage 86 is now lowered to the extent of the full depth of the cut desired in the work. This depth is pre-selected, and is indicated by a particular numerical indicium of the scale 290. Thus, as assembly 86 is lowered, plunger 130 is progressively extended to remain in contact with the upper end of the feed screw, due to the spring loading of the plunger. This in turn causes the index arm to traverse the scale, and when it reaches the desired indicium indicating the particular, desired depth of cut, the worker stops lowering the head assembly.

After the head assembly has been so adjusted to the desired depth, the feed stop nuts 128 are threaded along screw 106 to an extent that will be sufficient to rock pawl 150 counterclockwise in FIGURE 4, from its FIGURE 4 position to a position in which it will move into deep recess 162 of lever 158, permitting swinging of the lever to the left in FIGURE 4. In other words, when the head assembly has been adjusted manually to the full depth of the cut desired, with index arm 286 now registered with a calibration indicating said maximum depth, the feed control lever 158 is manually swung to its FIGURE 4 or on position, pawl 150 is swung to its lever-locking position of FIGURE 4, and feed stop nuts 128 are manually threaded downwardly along screw 106 until they will trip pawl 150. This allows lever 158 to return to its off position.

The handwheel 112 is now rotated in an opposite direction, to elevate the assembly 86, said assembly being raised to its starting position, which position will of course be indicated by the fact that the index arm 286 will move back to zero. The work pieces 194 are now returned to their position below the cathodic former, and the reciprocating head assembly is raised just sufficiently to provide a gap of .005 inch between the cathodic forming tool or element 184, and the top surfaces of the work pieces 194.

As a next step, the electrolyte pump 244 is placed in operation, by manual closing of switch 264. As shown in FIGURE 9, the motor 246 of this pump has its own circuit, independent of all other circuits in the structure.

It pumps electrolytic fluid from the reservoir or storage tank 248, through the piping 242, valve 240 (which would have previously been manually operated to open position) flexible supply tube 238, and conduit 236 into the cavity 180 (see FIGURES 3, 7 and 8). The fluid, under predetermined pressure resulting from operation of the pump, flows outwardly from within the cathodic former, through the several, slot-like apertures 192 (FIGURE 7) into the inter-electrode gap 193. The fluid is thus caused to impinge uniformly and completely upon all points of the confronting surfaces of the cathodic former and of the anodic work, wherever electrolytic action is to take place.

With the electrolyte flowing through the cathode apertures onto the work, the drive motor 40 for the reciprocating head assembly is started. By means of the belt-and-pulley linkages, the eccentric (including the offset shaft extension 80 and the ball bearing 82) begins to travel about the axis of the shaft 78, causing horizontal reciprocating movement of the cathode former support block 84 upon the rails 92. The reciprocation is effected in such a manner as to move the cathodic forming tool only through a short stroke in either direction, a desirable feature of the invention which will be discussed in greater detail hereinafter.

The next step is to move the feed control lever 158 to on position as in FIGURE 4. Referring to FIGURE 9, this will shift bridging element 170 to the right in FIGURE 9, into engagement with contacts 172. Lever 158 is held in the on position by pawl 150, which will be in the FIGURE 4 position thereof.

This closes a circuit to and including the feed motor 116, causing a slow rotation of the gear 110, in a direction to cause a correspondingly slow downward movement of the feed screw 106. The rate of movement of the feed screw is selected to be no faster than that which will permit the electrochemical dissolution or erosion of the work piece surface to proceed at the proper rate, and it is thus seen that the dissolution proceeds in a manner such that the cathode is progressively moved bodily downwardly toward the work surface to maintain the gap of .005 inch. All the while, of course, the cathode has reciprocating movement in a path perpendicular (in the illustrated example) to the downward movement of the cathode.

As will be noted from FIGURE 9, when the switch 168 was closed, this not only closed a circuit through the motor 116, but also energized relay 283, whereby to close contacts 285. Contacts 285 are in the lead 272 extending from the voltage regulator to the ammeter 278.

Therefore, movement of lever 258 to on position will not only start motor 116 to cause the downward feeding of the cathode, but also closes a D.C. circuit through the cathodic former 173, the electrolyte in the inter-electrode gap between the cathodic former and the work, and the anodic work pieces 194.

The work will now be machined, and the plane-to-plane presentation of the forming tool to the work will result in the work being machined to a shape complementary to that on the forming tool. Unusual shapes can of course be imparted to the work, such as the shape illustrated by way of example in FIGURE 8.

At all times, there is a gap of .005 inch between the work and the cathode, eliminating abrasion, and producing a particularly effective electrochemical dissolution of the work. No abrasives, insulating spacers, or the like are required in the cathodic former, and relatively low cost material can be used therefor.

When the work has been machined to the desired depth, previously selected in the manner described hereinbefore, the feed stop nuts 128 will trip pawl 150, freeing lever 158 for return movement to its off position under the spring loading of the switch plunger 166. This breaks the circuit that includes motor 116 and A.C. relay 283. Feeding of the cathode toward the anodic work piece immediately stops, and at the same time, the deenergizing of the relay opens the circuit through the cathode and anode, so that further electrochemical dissolution of the work is halted. One need only, at this time, open switch 264 to stop the pump motor and open switch 258 to stop the horizontal reciprocation of the cathodic former.

The head assembly is now returned to the starting position by first operating cam lever 124 to disengage gear 114 from gear 110; and then rotating feed nut 112 in a direction to raise the head assembly until the index arm 286 is returned to the starting position thereof shown in FIGURE 4.

It is to be noted that the construction is one which will permit the machining of a substantial number of like workpieces simultaneously. Considering, for example, FIGURE 7, the cathodic former is here shown in a neutral position. When moving to the right in FIGURE 7 from this neutral position, the left hand end of the lower portion 190 of the forming element would move to a point slightly short of the left hand end of the row of workpieces 194. Then, when moving from this extreme right position to the extreme left position, the lower portion of the forming tool will move at its right hand end to a point slightly short of the right hand end of the row of workpieces 194. This is only a short stroke, and it is to be noted that all of the workpieces are simultaneously machined, and all are subject to electrolytic action for 100% of the time cycle.

To accomplish this, I use a former which is slightly longer than the overall length of the workpiece or row of workpieces, plus the length of the reciprocating stroke.

Comparing this action with that which obtains when a conventional rotating disc is used, said disc in a typical arrangement would be disposed to the right of the row of work pieces 194. Then, the row of work pieces would have to be shifted bodily to the right in FIGURE 7, to be fed past the disc. The distance of movement of the work would be even greater than the overall length of the entire row shown in FIGURE 7. This is obviously so, since the last work piece 194 to be machined by the disc would be that which is at the left hand end of the row viewing the same as in FIGURE 7. This workpiece has to be moved to the right in FIGURE 7 a distance sufficient to permit its travel from its initial position shown in FIGURE 7 fully to and beyond the cathodic disc. Alternatively, if the work is kept stationary the disc itself would have to traverse the entire row, over a distance equal to that which the workpieces would have to be moved if the disc were kept in one place and if the workpieces were moved relative thereto.

Of importance, in this regard, is the fact that in this conventional arrangement not only must the work or the cathode be moved a distance which is many times that required when the present apparatus is employed, but also, the workpieces are machined in a successively following order, rather than simultaneously. In other words, each workpiece is machined only as it feeds past the disc. Therefore, the amount of time required to machine a given number of workpieces, when the rotating disc method is employed, is many times that required to machine an equal number of work pieces when the method of the present invention is practiced.

Notwithstanding these very important advantages deriving from the present invention, there are other advantages of great importance. One advantage resides in the fact that a relatively low cost cathodic forming material can be employed, requiring no diamond bort. A second advantage resides in the fact that electrolytic action occurs over every point of the inter-electrode gap, and is not reduced by the presence of insulation such as diamond bort. Another advantage resides in the fact that abrasion of the work piece is eliminated. Still another advantage results from the fact that there is no erosion whatever of the cathodic former, such as that which results when the spark discharge method is employed. Frequent dressing or replacement of the former is thus eliminated.

Yet another advantage results from the fact that special shapes, of an almost limitless variety, can be imparted to the work piece. Said shapes do not in any way hinge upon shapes which could be imparted to a cathodic disc, that is, there is no inhibition in respect to forming special shapes in the work, such as results when one is required to follow the method employing cathodic discs. Instead, one need merely provide cathodic formers of the desired, work-complementing shapes, and these formers can be readily interchanged in the apparatus.

Still further, there is at all times a full supply of electrolyte, in the inter-electrode gap, resulting from the pumping feature and from the fact that the electrolyte is fed from within the former, through a substantial number of apertures regularly spaced over the full length of the forming tool. This is not true when the conventional, rotating disc method is employed. In that arrangement, the electrolyte that is forced against the face or periphery of the disc is generally removed almost immediately by the centrifugal force resulting from rotation of the disc. As a result, only very small amounts of the electrolyte remain on the disc to produce and maintain electrochemical action.

Even additional advantages result from practicing of the present invention, as for example there is a highly improved washing out of loose particles of the material freed from the work by the electrochemical dissolution thereof. As soon as said particles are released, they are washed away immediately, due to the fact that the reciprocating motion of the cathodic former, taken in combination with the pumping of the fluid from within the former through a large number of apertures, provides at all times a fresh supply of electrolyte to the entire surface of the work.

Additionally, when machining such materials as tungsten carbide, the electrochemical action in the close inter-electrode gap changes the cobalt binder of the work to some altered form which is removed from the electrolytic cell physically as a movable particle, or chemically as a soluble compound, by the stream action flow of electrolyte. This is released and washed away by the force of the electrolyte flowing through the apertures in the cathode. In conventional practice, abrasives are necessary to remove this oxide film, and this is one of the purposes of diamond bort. If abrasives are not employed in conventional methods, the oxide tends to coat the anodic work surface, eventually halting further electrochemical dissolution of the work, since the electrolytic action is destroyed due to the inability of the current to flow from the cathode to the anode.

It is worthy of note that the invention embodies the use of a direct current of electricity of low voltage and high current density, flowing in a circuit in which the work piece is anodic; a small volume electrolytic cell containing a suitable electrolyte; and a reciprocating cathode movable bodily toward the work in a path angular to the path of reciprocation thereof, said cathode having multiple apertures through which the electrolyte flows to the cell or inter-electrode gap. This coactive relationship and relative arrangement of the parts will, when the cathode is brought into close proximity to the anodic work piece and electrolyte is flowing through the apertures into the mentioned gap, induce or create in said gap a complex electrochemical reaction that is not generally present in an electrolytic cell. The flow or streaming of the solution through the close gap will prevent or minimize concentration polarization.

Even further, no pressure or contact with the work is required, so that the cathode will last indefinitely. An additional advantage is found from the fact that means for positive starting and stopping of both the feed and of the electrolytic action, at predetermined times, is provided. In the prior art, hand feeding is required, and this of course means that the success or failure of the operation is wholly or largely dependent upon the skill of the particular operator. Not only is hand feeding eliminated in the present invention, but further, other means for speeding up the operation is provided, as for example a quick-acting clamping and releasing device for the work.

Means may be provided for removing excess electrolyte that may be present outside the desired area of electrolysis, as for example by air jets, not shown. Further, the machine might be used for the spark discharge method of electrolysis, by replacing the electrolyte with a dielectric fluid, a condenser across the electrode leads, and a means for supplying higher voltage. The work piece can be flooded with the dielectric fluid by flow through the cathode apertures, thus eliminating the necessity of immersing the work in a dielectric bath and draining the bath after each operation.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any change in construction that may be permitted within the scope of the appended claims.

Having thus described my invention, I claim as new, and desire to protect by Letters Patent:

1. Apparatus for electrolytically removing material from a workpiece, comprising: a stationary supporting structure; work support means on said structure, including a work support adapted for releasably clamping a workpiece in a position in which a surface thereof to be etched is faced upwardly in a generally horizontal plane; a pair of vertical rails fixedly secured to said structure above the work support; a former support carriage including an open center frame mounted on the rails for slidable advancement therealong toward the work support, a pair of horizontal rails fixedly attached to said frame across the open center thereof, and a block sliding on the horizontal rails so as to be reciprocable in a horizontal direction thereon while being advanced with the frame, said block having a rearwardly opening, vertically extending recess; a shaft journalled in said supporting structure and projecting into the recess; an eccentric extension rotating with the shaft in engagement with the walls of the recess, thus to reciprocate the block horizontally on rotation of the shaft during conjoint advancement of the block and frame toward the supported workpiece; means on said structure for rotating the shaft; a former fixedly mounted on the block in position facing downwardly toward the work support in close proximity thereto, said former being reciprocable with the block in a plane paralleling that of the supported workpiece, at a distance of approximately .005 inch from the workpiece; means on the supporting structure for advancing the frame toward the workpiece at the rate the latter is etched, thus to maintain the gap between the former and workpiece at .005 inch, said former having at least one opening in its face opposite the area in which the first named means holds the workpiece; means on the supporting structure for flowing electrolyte through said opening into the gap between the former and workpiece; and means on the supporting structure for electrically connecting the supported workpiece and former to positive and negative poles, respectively, of a source of electrical current so as to make the workpiece anodic with respect to the former by maintaining an etching potential therebetween.

2. Apparatus for electrolytically removing material from a workpiece, comprising: a stationary supporting structure; work support means on said structure, including a work support adapted for releasably clamping a workpiece in a position in which a surface thereof to be etched is faced upwardly in a generally horizontal plane; a pair of vertical rails fixedly secured to said structure above the work support; a former support carriage including an open center frame mounted on the rails for slidable advancement therealong toward the work support, a pair of horizontal rails fixedly attached to said frame across the open center thereof, and a block sliding on the horizontal rails so as to be reciprocable in a horizontal direction thereon while being advanced with the frame, said block having a rearwardly opening, vertically extending recess; a shaft journalled in said supporting structure and projecting into the recess; an eccentric extension rotating with the shaft in engagement with the walls of the recess, thus to reciprocate the block horizontally on rotation of the shaft during conjoint advancement of the block and frame toward the supported workpiece; means on said structure for rotating the shaft; a former fixedly mounted on the block in position facing downwardly toward the work support in close proximity thereto, said former being reciprocable with the block in a plane paralleling that of the supported workpiece, at a distance of approximately .005 inch from the workpiece, said former including an electrically insulative spacer secured to the underside of said block, an electrically conductive forming element support block secured to the underside of said plate and having a downwardly opening, shallow cavity, an electrically conductive mounting plate detachably, fixedly connected to the forming element support block and partially closing the cavity in underlying relation to the forming element support block, and a forming element of electrically conductive material affixed to the mounting plate and closing the remainder of the cavity; means on the supporting structure for advancing the frame toward the workpiece at the rate the latter is etched, thus to maintain the gap between the former and workpiece at .005 inch, said forming element having a plurality of openings communicating with the cavity and opening through the bottom face of the element into said gap opposite the area in which the workpiece is supported by the work support; means on said structure for flowing electrolyte into the cavity under pressure for forcing the electrolyte through the openings into said gap; and means on the supporting structure for electrically connecting the supported workpiece and former to positive and negative poles, respectively of a source of electrical current so as to make the workpiece anodic with respect to the former by maintaining an etching potential therebetween.

References Cited in the file of this patent

UNITED STATES PATENTS

| | | |
|---|---|---|
| 2,059,236 | Holslag | Nov. 3, 1936 |
| 2,739,935 | Kehl et al. | Mar. 27, 1956 |
| 2,746,918 | Whittington | May 22, 1956 |
| 2,764,543 | Comstock et al. | Sept. 25, 1956 |
| 2,798,846 | Comstock | July 9, 1957 |
| 2,826,540 | Keeleric | Mar. 11, 1958 |
| 2,871,177 | Comstock | Jan. 27, 1959 |
| 2,939,825 | Faust | June 7, 1960 |

FOREIGN PATENTS

| | | |
|---|---|---|
| 18,643 | Great Britain | of 1899 |
| 335,003 | Great Britain | Sept. 18, 1930 |

OTHER REFERENCES

Bleiweiss et al.: Metals and Alloys, November 1943, pages 1075–1080.